Figure 1:
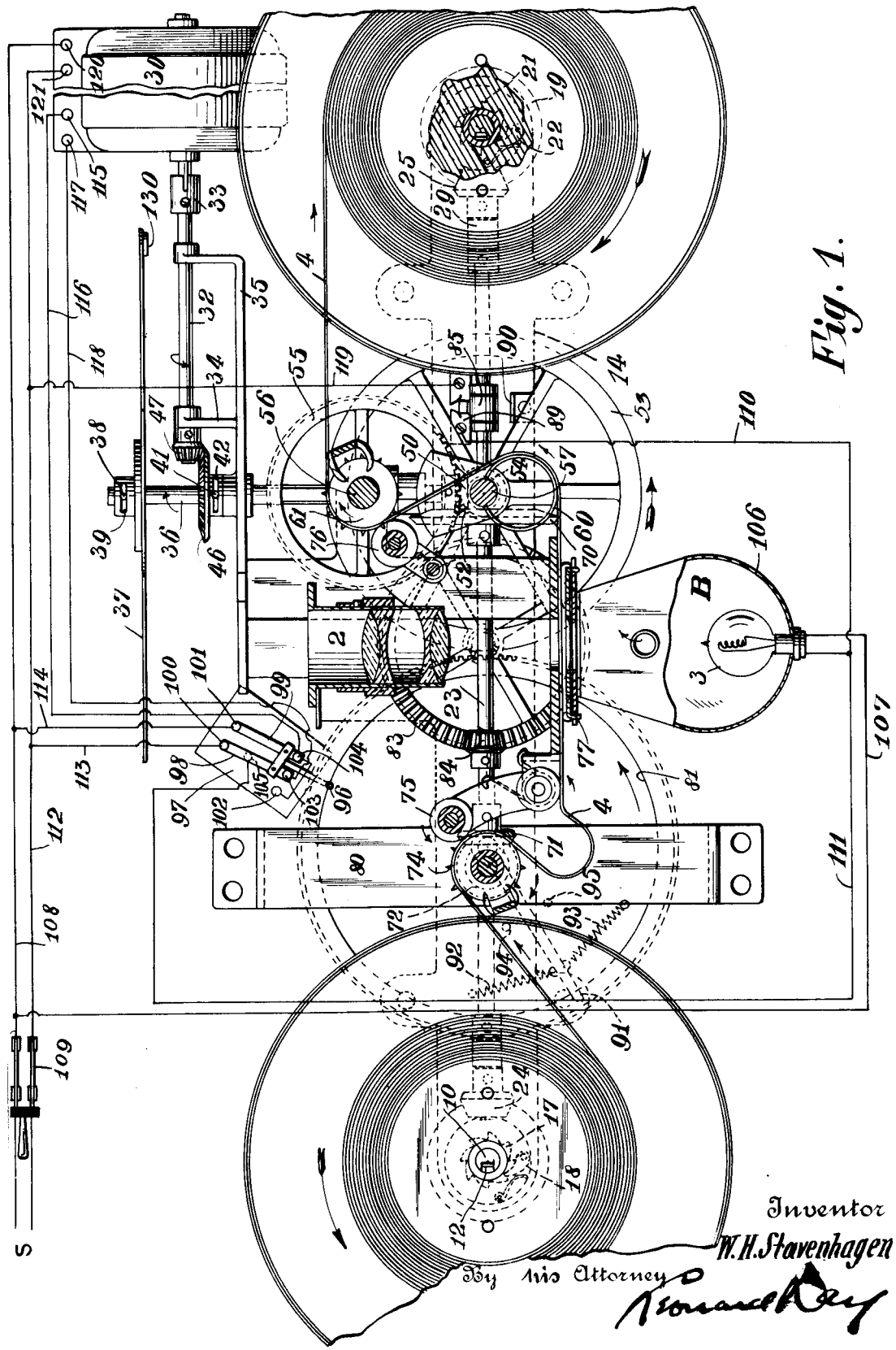

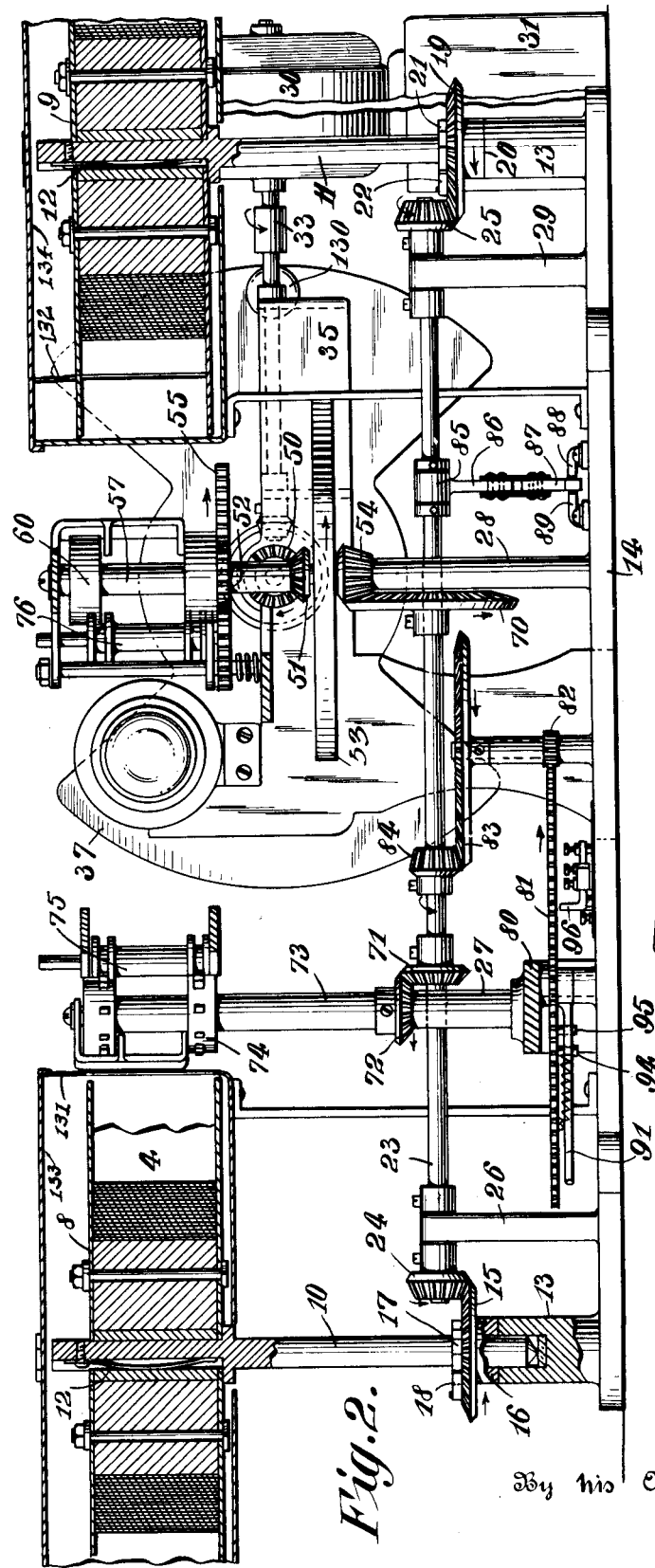
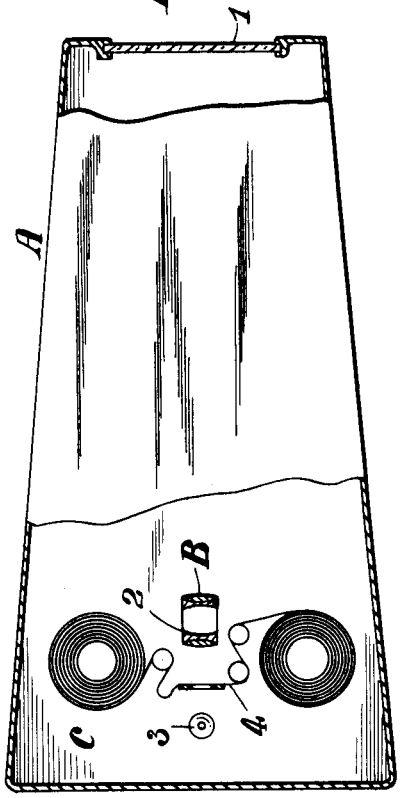

UNITED STATES PATENT OFFICE.

WILHELM H. STAVENHAGEN, OF NEW YORK, N. Y.

MOTION-PICTURE ADVERTISING.

1,199,506.

Specification of Letters Patent. Patented Sept. 26, 1916.

Application filed March 9, 1916. Serial No. 83,005.

*To all whom it may concern:*

Be it known that I, WILHELM H. STAVENHAGEN, a citizen of the United States, and a resident of New York, county and State of New York, have invented certain new and useful Improvements in Motion-Picture Advertising, set forth in the following specification.

This invention relates to advertising apparatus and its object is to cheapen and extend the scope of store-window demonstrative advertising.

That form of advertising, in which some article of manufacture is demonstrated in actual operation and use by an individual located in the shop-window of a store, has many advantages over the still-life display of the article itself. The human demonstrator usually accompanies his demonstration by displaying advertising placards giving the price and the name of the manufacturer of the article under demonstration. One of the faults of this form of advertising is that the demonstration requires substantially all the space in the ordinary store-window and many times its expense is prohibitive.

In furthering the object of the present invention there is contemplated the employment of motion pictures in combination with a still-life advertisement all on the same film. Images are projected forward toward the observer upon a translucent screen easily visible from the street.

In carrying out the object of the invention apparatus is contemplated which will operate automatically, hour in and hour out, displaying in motion pictures the same kind of an advertising demonstration that might otherwise have been accomplished by a living operator in the window, but all in a space only a small fraction of that necessary for the human operator.

It is also contemplated that the apparatus itself be automatic and capable of operating to reproduce any desired demonstration merely by changing the film on the reels.

To these ends the apparatus comprises novel elements and novel combinations of elements, all of which will be better understood from the illustrative embodiment set forth in the following specification and illustrated in the accompanying drawings, which form a part hereof, and in which like characters represent corresponding parts in the several figures, and in which:—

Figure 1 is a diagrammatic illustration partly in plan and partly in horizontal section of a preferred embodiment of the mechanism of the invention; Fig. 2 is a diagrammatic vertical cross-section of the same; Fig. 3 is a detail plan of an example of film to be employed; and Fig. 4 is a plan view partly in section and with parts broken away, showing the housing and assemblage of the apparatus.

As a complete article of manufacture, the apparatus comprises a suitable housing A, shown in the drawings as a unitary structure although unity is by no means essential. The housing A is fitted at the front end with a screen 1 of translucent material or of any material capable of displaying images from the exterior which are thrown thereon from the interior. It is to be understood, however, that the usefulness of much of the apparatus is not dependent upon the coöperation of a translucent screen. The housing A likewise may be provided with suitable doors, supports and the like. In the rear portion of the interior of the housing A is an image-projecting mechanism B comprising suitable focusing lenses 2 and a source of light 3. There is also provided operating means C for passing a film 4 through the projecting field of the image-projecting mechanism B in the desired and suitable manner. The film employed may be the commercial motion picture film carrying a sequence of a large number of photographs of the moving scene or demonstration, but to further part of the object of the invention it is preferable that at least the finish end or both ends of the strip of film employed comprise one or a comparatively small number of still-life advertisements such as are indicated for the ends 5 and 6 in Fig. 3, while the major portion of the strip of film centrally located relatively to the ends carries the usual large number of slightly different photographs customary of employment to produce motion pictures.

Inasmuch as it is necessary to provide for oft-repeated forward and backward travel of the film, the mechanism for winding and re-winding or, in other words, for forward and for backward winding of the film is important. In the preferred embodiment of the invention the film is neither wound with the aid of or against gravity but the winding reels 8 and 9 are both arranged at the same level and to operate on vertical axes provided by the vertically journaled spindles 10 and 11. Each of the reels 8 and 9 is frictionally connected with the corresponding spindle through the medium of a friction spring 12. Each spindle is suitably journaled as for instance in a vertical stud-bearing 13, supported by the frame 14. The spindle 10 loosely carries a bevel gear 15 between the collar 16 and the ratchet 17, both affixed to the spindle. The bevel gear 15 carries a pawl 18 operative against the ratchet 17 to drive the spindle 10 when the bevel gear 15 is driven in a clockwise direction as viewed in Fig. 1. In a similar manner, the spindle 11 loosely carries a bevel gear 19 between the collar 20 and the ratchet 21 both affixed to the spindle 11, and the pawl 22 is fitted to the bevel gear 19 to coöperate with ratchet 21 to effect rotation of the spindle 11 when the bevel gear 19 has a clockwise rotation. For opposite rotations of the bevel gears 15 and 19 there is no driving of the spindles. The bevel gears 15 and 19 are suitably intergeared as by the counter-shaft 23 carrying at its ends the bevel pinions 24 and 25 and suitably journaled in uprights 26, 27, 28 and 29 mounted on the frame 14.

Mechanical power is supplied from the reversible electric motor 30 suitably mounted as upon the base 31 and with its drive-shaft driving the shaft 32 through the medium of a suitable cushioning clutch 33. The purpose of the cushioning clutch is to relieve sudden stresses after the reversal of the motor and during the operation of the mechanism. The shaft 32 is suitably journaled in arms 34 and 35 supported from the base 14 and is shown at right-angles to the cross shaft 36 at the forward end of which shaft 36 is carried the rotary shutter 37 loosely mounted thereon, but to be driven thereby through a lost motion connection provided in any suitable manner as by the pin 38 and slot 39. A bevel gear 46 is likewise carried loosely on the shaft 36 to drive the same through any suitable lost motion or slack connection which may be formed by the pin 41 and slot 42. Meshing with the bevel gear 40 is the bevel pinion 47 on the end of the shaft 32 which may either be fast thereto or provided with a slack connection like that for the gear 40. The shaft 36 is suitably journaled and extends inwardly through the bevel gear 50 fixed at its inner end and meshing with the bevel pinion 51 which, together with the pinion 52, fly-wheel 53 and bevel pinion 54, are rigidly interconnected to rotate together on a vertical axis, the pinion 52 driving the gear 55 mounted on the spindle 56 of a suitable commercial type of feeding mechanism for motion picture film. The spindle 57 interconnecting the previously mentioned parts 51, 52, 53 and 54 carries the striker-intermittent feeding device 60 for the film, while it is the spindle 56 which carries the spurred positive feeding drum 61.

The pinion 54 meshes with the bevel gear 70 on the counter-shaft 23, which counter-shaft, through the medium of the bevel gear 71 drives the bevel gear 72 secured to the vertically journaled spindle 73 which carries the second spurred feed-drum 74 and drives the same at the same speed and in the same direction as the spurred drum 61 is driven. All usual devices such as the rollers 75 and 76 and the film slide 77 are of course present in the mechanism. In fact, the actual operating means for passing a film having a sequence of images through the projecting field of the image-projecting mechanism B, may be any commercial type of apparatus which permits a film to be moved either backward or forward, the forward direction in the figures being in the direction of the arrows shown in Fig. 1.

The spindle 73 is suitably journaled upon the stud 27 which in turn is supported by the cleat 80 to accommodate the large timing gear 81 suitably vertically journaled so as to be in mesh with the gear 82 carried on the same vertical shaft as the bevel pinion 83 which meshes with the bevel gear 84 carried by the counter-shaft 23. The drive gearing for the timing gear 81 is suitably designed so that one rotation of the timing gear 81 corresponds to a complete travel in the appropriate direction of the film 4. Also mounted on the counter-shaft 23 is a friction sleeve 85 carrying the pendant arm 86 from which is insulated but to which is suitably mechanically secured the circuit-closing arm 87 which, when pressed against the contacts 88 and 89, completes an electric circuit therebetween but which, when retracted by friction from the counter-shaft 23, is limited in movement by the stop 90. A rotation of the counter-shaft 23 in the direction of the arrows shown in Fig. 2 closes the circuit between the fingers 88 and 89 and a rotation in the opposite direction opens the circuit therebetween.

Loosely mounted upon the same spindle as is the timing gear 81 is the striker arm 91 held in mid-position by the opposing tension-springs 92 and 93 midway between the limiting pins 94 and 95 fixed in the lower face of the timing gear 81 and extending across the path of travel of the striker arm 91. The outer end of the striker arm 91 is positioned to engage the outer end of the handle 96 of the reversing switch 97, the parallel blades of which are 98 and 99 and the terminals of which are 100, 101, 102, 103, 104 and 105.

The image-projecting mechanism B comprises a suitable lamp 3, reflector 106 and lens mechanism 2 with suitable coöperating parts (including a cooler if desired) to combine the same with the operating means. The lamp 3 has one terminal connected by the wire 107 with wire 108 leading from one pole of the source of power S which may be controlled by the switch 109. The other terminal of the lamp 3 is connected with the contact finger 89 by wire 110 and with the terminal 105 of the reversing switch 21 by the wire 111. The terminals 100 and 101 of the reversing switch are respectively connected with the source-mains 112 and 108 by the wires 113 and 114. The terminals 102 and 104 of the reversing switch are connected with the field terminal 115 of motor 30 by wire 116 and the terminal 103 of the reversing switch is connected with field terminal 117 of motor 30 by wire 118. Contact finger 88 is conected with the source-main 112 by wire 119. The source mains 108 and 112 are connected to the armature terminals 120 and 121 of the motor 30.

Operation: The electric connections are such for the apparatus as to produce rotation of the motor 30 in the direction of the arrow shown in Fig. 1. The electric circuit for the lamp 3 is closed at two points, viz, betwen the blade 98 and the terminal 105 and from the contact finger 88 to the finger 89 by the bridge 87. The film 4 has been fed in a forward direction about half-way its length so that the motion picture demonstration is being illustrated on the translucent screen 1 by the intermediate portion 7 of the film 4. For this position of the apparatus the slack connections 38—39 and 41—42 would naturally be in such a position that each pin would be at the end of travel in its slot. But they are shown as they are the better to illustrate the slack connection.

The gearing from the counter-shaft 23 to the reel 9 is so proportioned that the reel 9 will take up all of the film as fast as it is fed by the spurred drum 61 even when the film has just commenced to be wound upon the reel 9. Of course, as the diameter of the reeled film increases its peripheral speed would increase, but the friction spring 12, by slipping, takes care of this condition as is customary in take-up reels. The same proportioning of gearing for the reel 8 exists.

When the apparatus has been operated until the end of the motion picture demonstration has been completed the finish end 5 of the film is reached but just as it is reached the striker 91 has thrown the reversible switch 97 to the left as shown in Fig. 1 to reverse the field of motor 30 and break the circuit for the lamp 3 between the arm 98 and the terminal 105. The motor comes to rest and then slowly starts up in the reverse direction but the circuit through the lamp 3 is still maintained through bridge 87 so as to maintain the coöperation of the image-projecting mechanism with the operation of the film, at this stage effecting the projection of a still-life display. When the motor comes to rest the shaft 36 also comes to rest and the weight 130 on one sector of the shutter 37, through the provision of the slack connection 38—39, permits the shutter 37 to fall to a position so as not to obscure the image being projected from the image-projecting mechanism B. Through the medium of the slack connection 41—42 the motor reverses under zero-load and the film remains at rest for an appreciable length of time displaying one of the still-life advertisements shown in section 5. The circuit for lamp 3 is maintained closed by the bridge 87 until the actual reverse movement of the counter-shaft 23 has taken place. This commences as soon as the motor 30 has taken up all the slack of the slack connections provided. Thus the operation of the image projecting mechanism in coöperation with the part of the film from which an image is to be projected is maintained independently from the operation of the motor or source of mechanical power which drives the apparatus. This is all accomplished automatically.

No provision is made for jerking the film in a backward direction intermittently, as the instant that reverse motion takes place the circuit for the lamp 3 is broken by the bridge 87 and the pawl 18 positively operates the spindle 10 to wind up the film 4 in a backward direction upon the reel 8. There being no light there is no need of a jerky motion for the film.

When the film has been sufficiently wound up upon the reel 8 the timing gear 81, now having been moved clockwise as viewed in Fig. 1, throws the reversing switch 98 back into the position illustrated in Fig. 1. This instantly closes the circuit for the lamp 3 through the terminal 105 causing the illumination of the still-life advertisement at the commencing end 6 of the film. This takes place for an appreciable length of time or until the motor 30 has taken up all its slack connection and has commenced to feed and drive forward the film. The second motion picture demonstration then takes place, the circuit for lamp 3 is closed at a second point by the bridge 87, and operation is automatically repeated as long as the switch 109 is kept closed. This controlling of the condition of the light in the image-projecting mechanism by turning off the light entirely after the operation of the film employed to project motion pictures is effected by an illustrative mechanism, that is, a system of switches independent of the actual reversing of the source of mechanical power. It is of course to be understood that this means for controlling the image-projecting mechanism is intended to be merely illustrative of all possible means for effecting the broad object of causing the removal of the beam of light from that motion picture part of the film when the same is moving backward.

The mounting of the reels 8 and 9 on vertical axes renders the introduction of new film especially easy. The slots 131 and 132 in the reel casings makes necessary only the removal of the covers 133 and 134 to take out the reels. In fact no casings for the reels are essential. Then the reels need only to be lifted off the spindles. The mode of removal of film from the rest of the operating mechanism as well as the mode of its introduction is easy and may be that of any commercial projector.

What I claim and what I desire to secure by United States Letters Patent is:—

1. In an automatic advertising apparatus; image-projecting mechanism for projecting images; operating means for passing a film having a sequence of images through the projecting field of said image-projecting mechanism, said operating means comprising the necessary parts to effect the projection of motion pictures from a portion of the film, including a pair of reels each for winding and unwinding film alternately; automatic means for effecting the automatic winding of the film in a forward direction, automatically bringing it to rest for an appreciable interval, then automatically winding the film in a backward direction, automatically bringing the film to rest, and then moving the film again and again automatically in the same manner; and means for rendering the image-projecting mechanism inoperative throughout a large portion of each backward winding upon the portion of the film projected during the forward winding, whereby a motion picture demonstration of an advertised article followed by a still-life advertisement may be reproduced successively and automatically from a single strip of film.

2. In an automatic advertising apparatus as an article of manufacture, an externally visible translucent screen; image-projecting mechanism in the rear of said screen for projecting images to be visible from the front of said screen; operating means for passing a film having a sequence of images through the projecting field of said image-projecting mechanism, said operating means comprising the necessary parts to effect the projection of motion pictures from a portion of the film, including a pair of reels each for winding and unwinding film alternately; automatic means for effecting the automatic winding of the film in a forward direction, automatically bringing it to rest for an appreciable interval, then automatically winding the film in a backward direction, automatically bringing the film to rest, and then moving the film again and again automatically in the same manner; and means for rendering the image projecting mechanism inoperative, throughout a portion of each backward winding, upon a portion of the film projected during the forward winding, whereby a motion picture demonstration of an advertised article followed by a still-life advertisement may be reproduced successively and automatically from a single strip of film without reverse motion in the motion-picture projection.

3. In an automatic motion-picture apparatus, image-projecting mechanism for projecting images; operating means for passing a film having a sequence of images through the projecting field of said image-projecting mechanism, said operating means comprising the necessary parts to effect the projection of motion pictures from a portion of the film, including means for effecting a movement of the film automatically first in a forward direction and then in a backward direction and again in a forward direction, the same over and over again, a source of mechanical power for driving the various parts, and means for reversing the operative direction of said source of mechanical power; and means for rendering the image-projecting mechanism inoperative upon the portion of film projected during a forward movement when said portion is having a backward movement, said means being arranged to be actuated independently from and at a time later than the reversal of said source of mechanical power.

4. In an automatic motion picture apparatus an inclosing container providing a horizontal supporting base at the bottom; an inclosed forwardly reflected source of light at the rear of said container; image-projecting lenses in front of said source of light; two combined winding and unwinding spindles located respectively on opposite sides of said source of light; two film reels supported respectively on said spindles and each removable from the top; motion-picture feeding mechanism for passing a film with an intermittent movement through the image-projecting field of said source of light; shutter mechanism in front of said image-projecting lenses; an electric motor for imparting motion to the various moving parts; automatic means for effecting the automatic reversal of the direction of movement from said motor to said parts at a time approximating the complete unwinding of film from any one of said reels; and automatic means for controlling the beam of light upon said film to change the beam of light in relation to whether the portion of the film to be projected for motion pictures is moving forward or backward.

5. In automatic apparatus for projecting motion-pictures, a source of mechanical power; automatic means for reversing the direction of the application of said source of power to effect alternately a forward and a backward movement of the portion of the film employed to project motion-pictures; a source of light having a projecting field coöperating with the film and means operated independently of the reversal of said source of mechanical power for changing the condition of the field of light from said source according to whether the motion-picture-portion of the film is moving forward or backward.

6. In automatic projecting apparatus for motion-pictures, in combination, a film having a portion bearing a sequence of motion-picture-images and a second portion having one or more still-life images; means for moving the film forward and backward; image-projecting mechanism; means for arresting the movement of the still-life portion of said film in the field of said image-projecting mechanism for an appreciable length of time greater than the period of projection of a motion-picture image; and means controlling said image-projecting mechanism for maintaining the projecting beam of light upon the still-life portion of said film without regard to its direction of movement but removing said beam of light from the motion-picture-portion of said film when the same is moving in a backward direction.

In witness whereof, I have signed my name to this specification, in the presence of two subscribing witnesses, this 7th day of March, 1916.

WILHELM H. STAVENHAGEN.

Witnesses:
SARAH LICHTENTHAL,
LEON BLUMENTHAL.